(12) United States Patent
Njeim

(10) Patent No.: US 11,230,341 B2
(45) Date of Patent: Jan. 25, 2022

(54) NOSE-DIVE PREVENTION DEVICE FOR A ONE-WHEELED TRANSPORATION DEVICE

(71) Applicant: Antoine M. Njeim, Astoria, NY (US)

(72) Inventor: Antoine M. Njeim, Astoria, NY (US)

( * ) Notice: Subject to any disclaimer, the term of this patent is extended or adjusted under 35 U.S.C. 154(b) by 35 days.

(21) Appl. No.: 16/746,932

(22) Filed: Jan. 19, 2020

(65) Prior Publication Data

US 2020/0231242 A1 Jul. 23, 2020

Related U.S. Application Data

(60) Provisional application No. 62/795,331, filed on Jan. 22, 2019.

(51) Int. Cl.
*B62K 11/00* (2006.01)
*A63C 17/12* (2006.01)

(52) U.S. Cl.
CPC ............ *B62K 11/007* (2016.11); *A63C 17/12* (2013.01)

(58) Field of Classification Search
CPC combination set(s) only.
See application file for complete search history.

(56) References Cited

U.S. PATENT DOCUMENTS

| | | | | |
|---|---|---|---|---|
| 2005/0101441 A1* | 5/2005 | Rosborough | ........ | A63B 22/203 482/51 |
| 2016/0136508 A1* | 5/2016 | Bigler | .................. | A63C 17/014 180/181 |
| 2017/0144718 A1* | 5/2017 | Tinaphong | ........... | B62K 11/007 |
| 2017/0361205 A1* | 12/2017 | Bigler | .................. | A63C 17/014 |
| 2018/0161661 A1* | 6/2018 | Ma | ........................ | A63C 17/004 |
| 2018/0326294 A1* | 11/2018 | Ma | ............................ | B62K 1/00 |
| 2019/0299082 A1* | 10/2019 | Hoover | .................. | A63C 17/08 |

* cited by examiner

*Primary Examiner* — Brian L Swenson
(74) *Attorney, Agent, or Firm* — Barry Choobin; Patent 360

(57) ABSTRACT

A nose-dive prevention device for a one-wheeled motorized transportation device is disclosed, which has wheels that strike the ground in the event of a nose-dive situation, instead of the bumper, which could otherwise become abruptly hung and thus throw the rider. The nose-dive prevention device has a base for attachment to the front of the one-wheeled motorized transportation device, and one or more wheels connected to and extending from the base. The wheels are positioned to interpose between the front end of the one-wheeled motorized transportation device and the ground and contact the ground when the front end exceeds a nose-dive angle. However, under normal riding conditions, the wheels are spaced above the ground at a height sufficient to allow normal angular variability of the riding platform needed for control of the one-wheeled motorized device.

17 Claims, 11 Drawing Sheets

NOSE-DIVE PREVENTION DEVICE FOR A ONE-WHEELED TRANSPORATION DEVICE

CROSS-REFERENCE TO RELATED APPLICATIONS

This application claims the benefit of U.S. Provisional Application No. 62/795,331, filed Jan. 22, 2019, the contents of which are incorporated herein by reference.

BACKGROUND OF THE INVENTION

1. Field of the Invention

The present invention generally relates to a device to prevent nose-dives in one-wheeled, motorized transportation devices, such as the Onewheel device, or similar such single-wheeled transportation devices.

2. Description of the Related Art

Single-wheeled motorized transportation devices are growing increasingly popular. A non-limiting example of such devices is the Onewheel, as shown at https://onewheel.com/. These devices are fun to ride, provide reasonable transportation ranges in urban environments, and have a relatively small footprint and thus are relatively easy to both store and carry.

A drawback of these one-wheeled devices is that they can nose-dive under certain conditions, such as abrupt breaking, over acceleration, loss of power, or from inexperienced use. In a nose-dive situation, the bottom of the leading footrest slams into the ground, where it will most likely catch, throwing the user off the device and leading to potentially serious injury.

There therefore exists a need for systems which can prevent or alleviate the dangers associated with such nose-dives.

SUMMARY OF THE INVENTION

In one embodiment, a nose-dive prevention device for a one-wheeled motorized transportation device includes a base configured to be fixedly attached to a first end of the one-wheeled motorized transportation device, and at least one wheel connected to and extending from the base. The wheel is positioned to interpose between the first end of the one-wheeled motorized transportation device and the ground and contact the ground when the first end exceeds a nose-dive angle, and is spaced above the ground when the first end is less than the nose-dive angle.

In some embodiments, the base includes a plate configured to be fixedly attached to the one-wheeled motorized transportation device, and one or more brackets extending from the base, with the one or more wheels rotatably connected to the bracket.

In a further refinement, in some other embodiments the plate comprises a first portion and a second portion, the first portion being bent with respect to the second portion so that the plate conforms to the first end of the one-wheeled motorized transportation device. In some embodiments, the one or more brackets extend along the second portion of the plate.

Some embodiments comprise at least two wheels mounted and spaced-apart on an axle, with the axle connected to the bracket, and a handle rotatably mounted on the axle and disposed between the two wheels. In a further refinement, the axle may be removably connected to the bracket, and the handle and the wheels removably disposed on the axle.

Other embodiments include a grip that is configured to be attached to a second end of the one-wheeled motorized transportation device opposite the first end.

BRIEF DESCRIPTION OF THE DRAWINGS

The various aspects and embodiments disclosed herein will be better understood when read in conjunction with the appended drawings, wherein like reference numerals refer to like components. For the purposes of illustrating aspects of the present application, there are shown in the drawings certain preferred embodiments. It should be understood, however, that the application is not limited to the precise arrangement, structures, features, embodiments, aspects, and devices shown, and the arrangements, structures, features, embodiments, aspects and devices shown may be used singularly or in combination with other arrangements, structures, features, embodiments, aspects and devices. The drawings are not necessarily drawn to scale and are not in any way intended to limit the scope of this invention, but are merely presented to clarify illustrated embodiments of the invention. In these drawings.

DETAILED DESCRIPTION OF THE PREFERRED EMBODIMENTS

Various embodiment nose-dive prevention devices are disclosed herein. The various embodiment devices may be sold in kit form, in which a user of a one-wheeled device installs the nose-dive prevention device on his or her one-wheeled motorized device. Alternatively, a manufacturer of such one-wheeled motorized devices may preinstall the nose-dive prevention devices prior to selling their one-wheeled motorized devices to the public.

Figure 1:
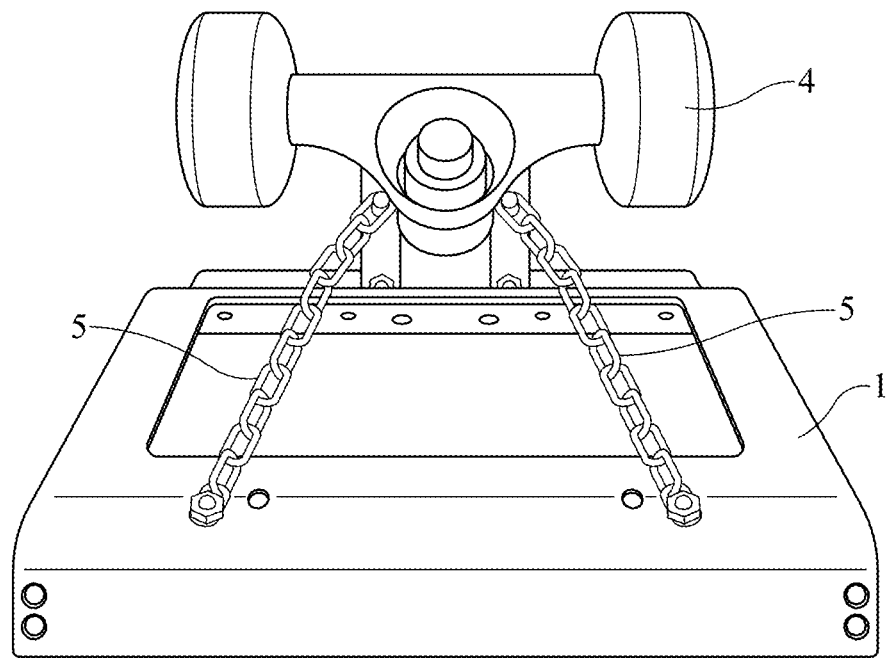
FIG. 1 is a bottom perspective view of a first embodiment nose-dive prevention device.
Figure 2:
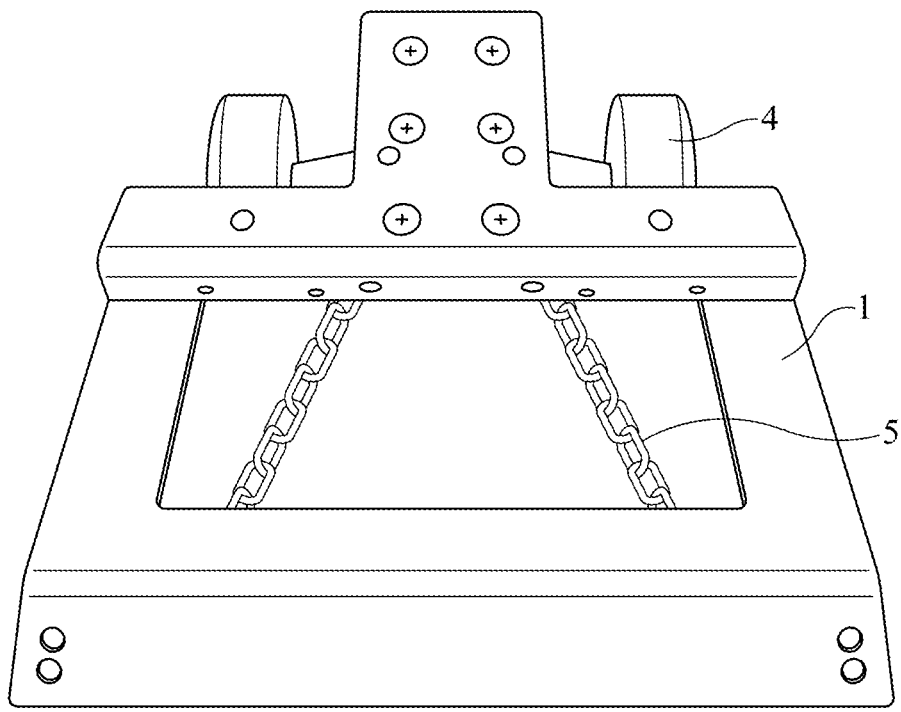
FIG. 2 is a top perspective view of the device shown in FIG. 1.
Figure 3:
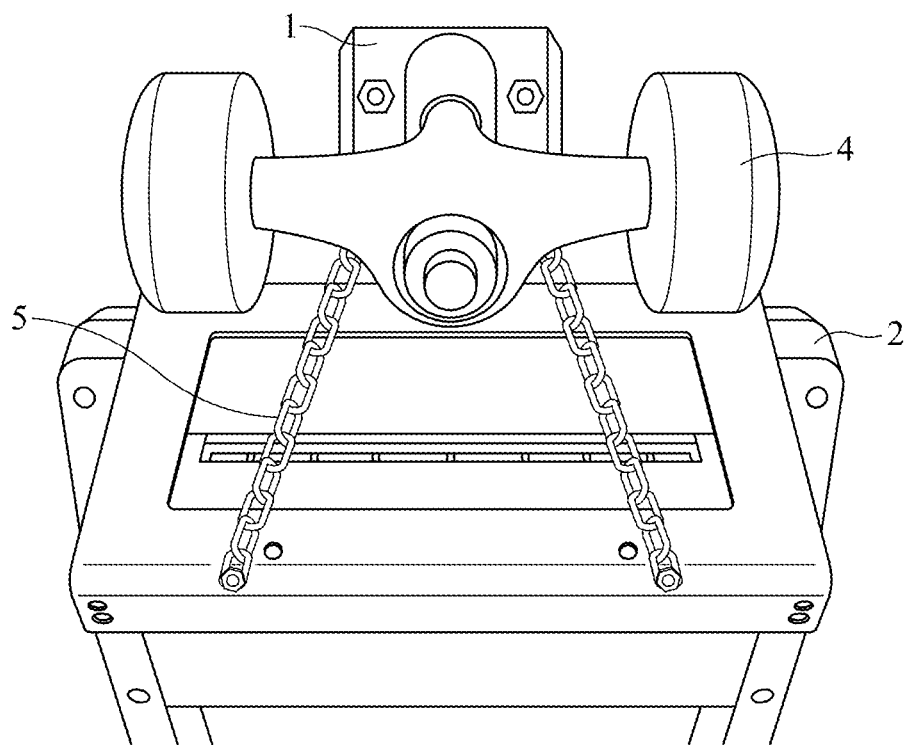
FIG. 3 is a bottom perspective view of the device of FIG. 1 attached to a one-wheeled device.
Figure 4:
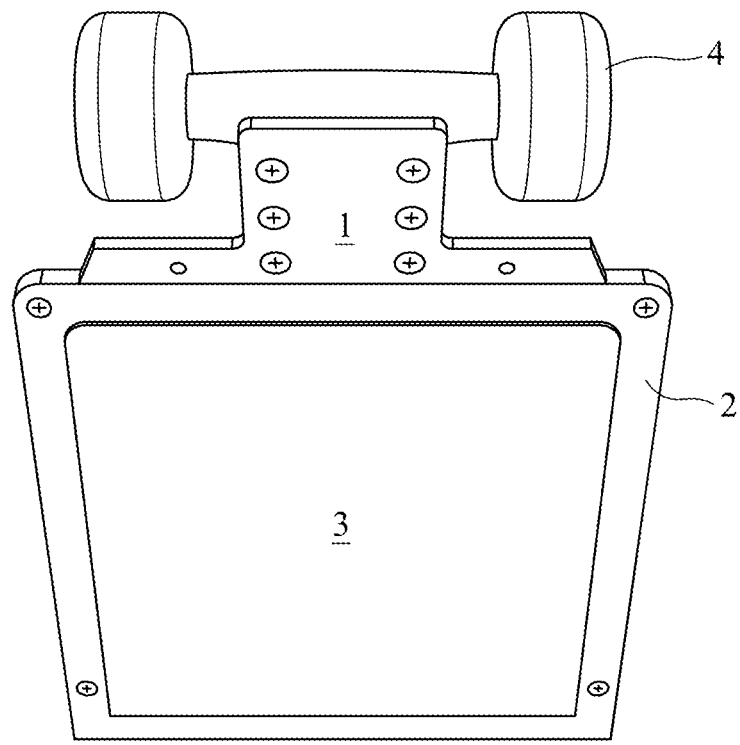
FIG. 4 is a top perspective view of the device of FIG. 1 attached to a one-wheeled device.

FIGS. 1-6 depict a first embodiment nose-dive prevention device. FIGS. 1 and 2 depict a kit form of the first embodiment nose-dive prevention device, while FIGS. 3-6 depict the embodiment device installed on a one-wheeled motorized device.

As shown in FIGS. 1-4, an aluminum plate 1, or of any other suitable material such as steel or carbon fiber, and which may be molded or formed by any other suitable means, provides a base that is designed to be attached to the frontal part 2 of a one-wheeled motorized device 3 (such as a Onewheel or the like). A skateboard truck 4 is mounted on plate 1 and supported by chains 5 to avoid bending upon a nose-dive situations when riding the motorized device 3.

58 mm wheels (or wheels of greater or lesser diameter) of truck 4 may be used to permit clearance for the frontal angle to allow the one-wheeled device 3 to ride normally. Hence, in normal operations, the wheels of truck 4 do not touch the ground but instead are spaced above it. By way of example, the truck 4 may be positioned so that the angular variation of the riding platform is reduced by 1 inch. That is, if normally the front end 2 is spaced "X" inches above the ground when one-wheeled device 3 is level, thus allowing a tilting angle range of "X" inches from level riding to nosedive, truck 4 would reduce this by 1 inch, so that the angular range (from level riding to forward nosedive) would be "X−1" inches.

The first embodiment is attached, for example, with two or more screws on the rail and another two (or more) screws into plastic bumper of the one-wheeled device 3.

Figure 5:
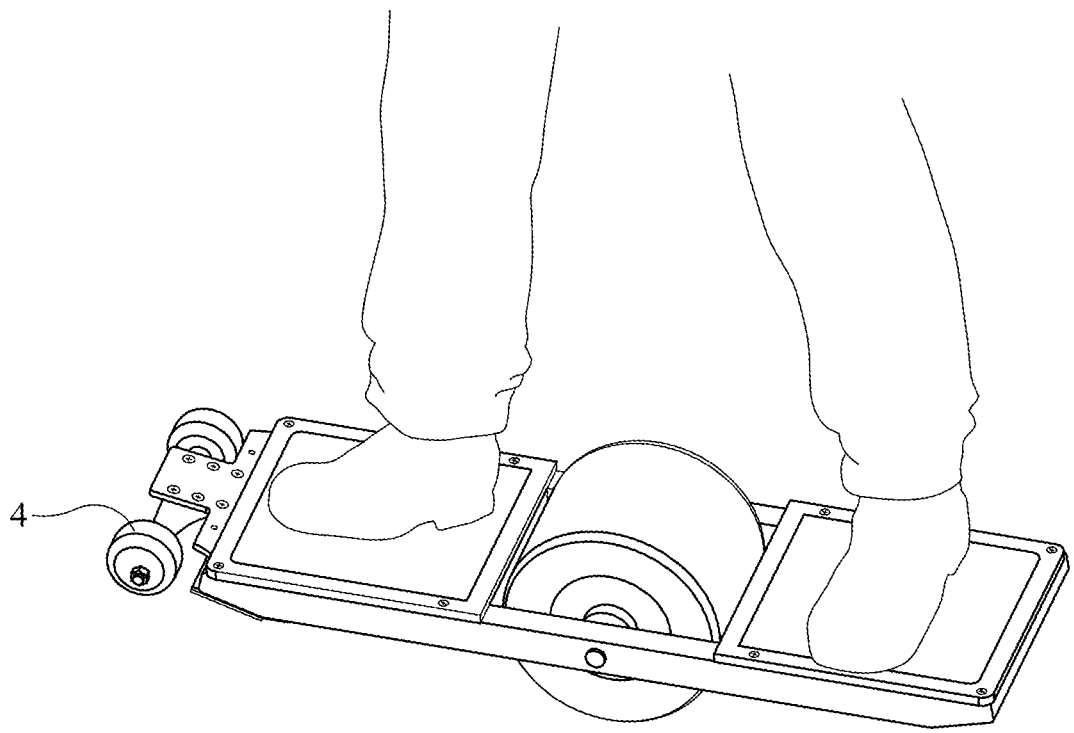
FIG. 5 shows the device of FIG. 1 in use during normal operations of a one-wheeled device.
Figure 6:
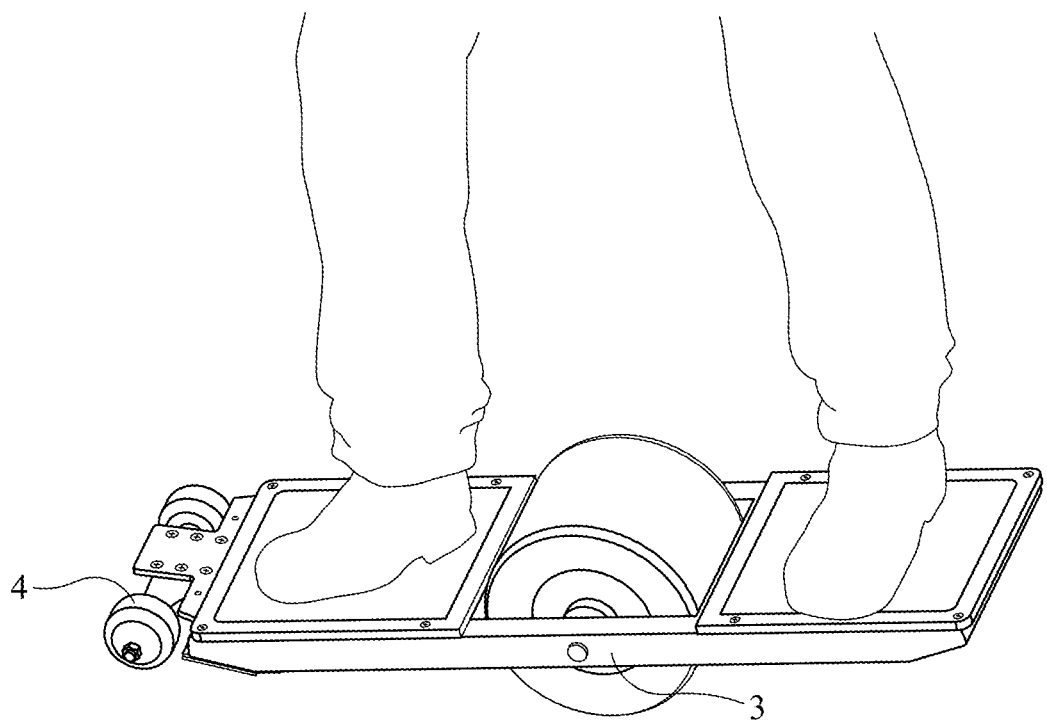
FIG. 6 shows the device of FIG. 1 in use during in a nose-dive situation.

As illustrated in FIGS. 5 and 6, an objective of the embodiment nose-dive device is, in the event of a nose-dive, as shown in FIG. 6, be it as a result of user error or malfunctioning electronics in one-wheeled device 3, the rider won't slam down into the ground. Instead, when the riding platform of one-wheeled device 3 exceeds a certain tipping angle, truck 4 will contact the ground and thus allow time to slide and run it out. By way of example, if the front portion 2 of one-wheeled device 3 can normally dip down by 6 inches before striking the ground, the tipping angle may be set at a 5 inch displacement—that is, the tipping angle may be the angle that the riding platform achieves when the front end 2 tips down 5 inches. However, as shown in FIG. 5, when riding normally, the wheels of truck 4 ride above the ground and thus allow the one-wheeled motorized device 3 to operate in a standard manner.

Figure 7:
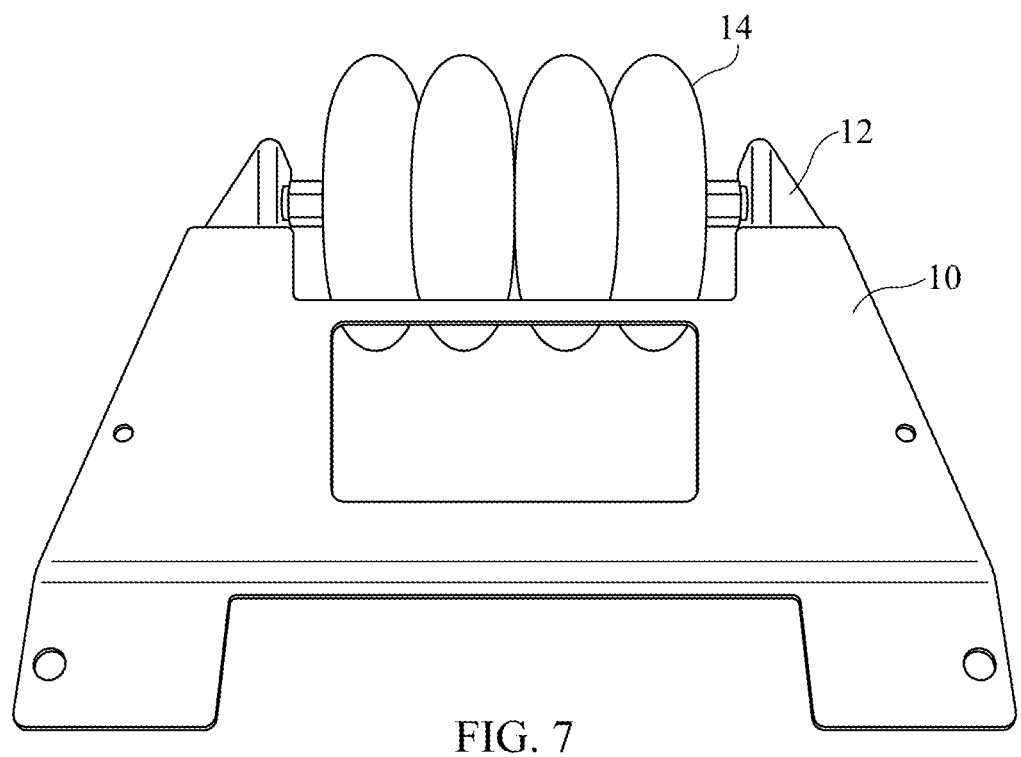
FIG. 7 is a bottom perspective view of a second embodiment nose-dive prevention device.
Figure 8:
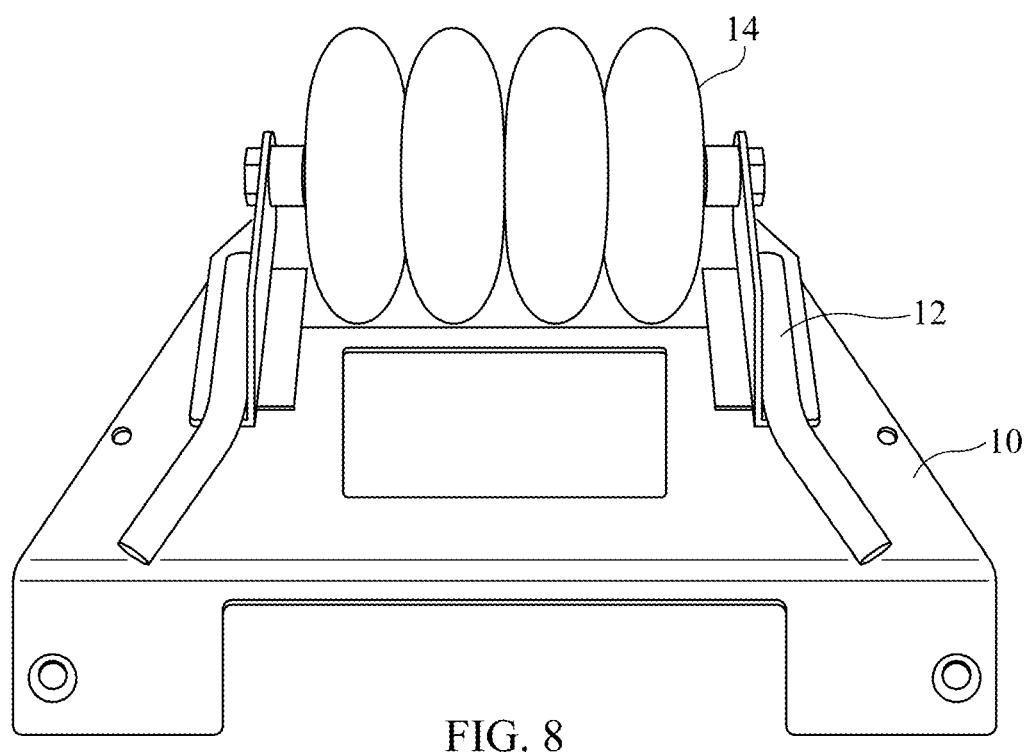
FIG. 8 is a top perspective view of the device shown in FIG. 7.
Figure 9:
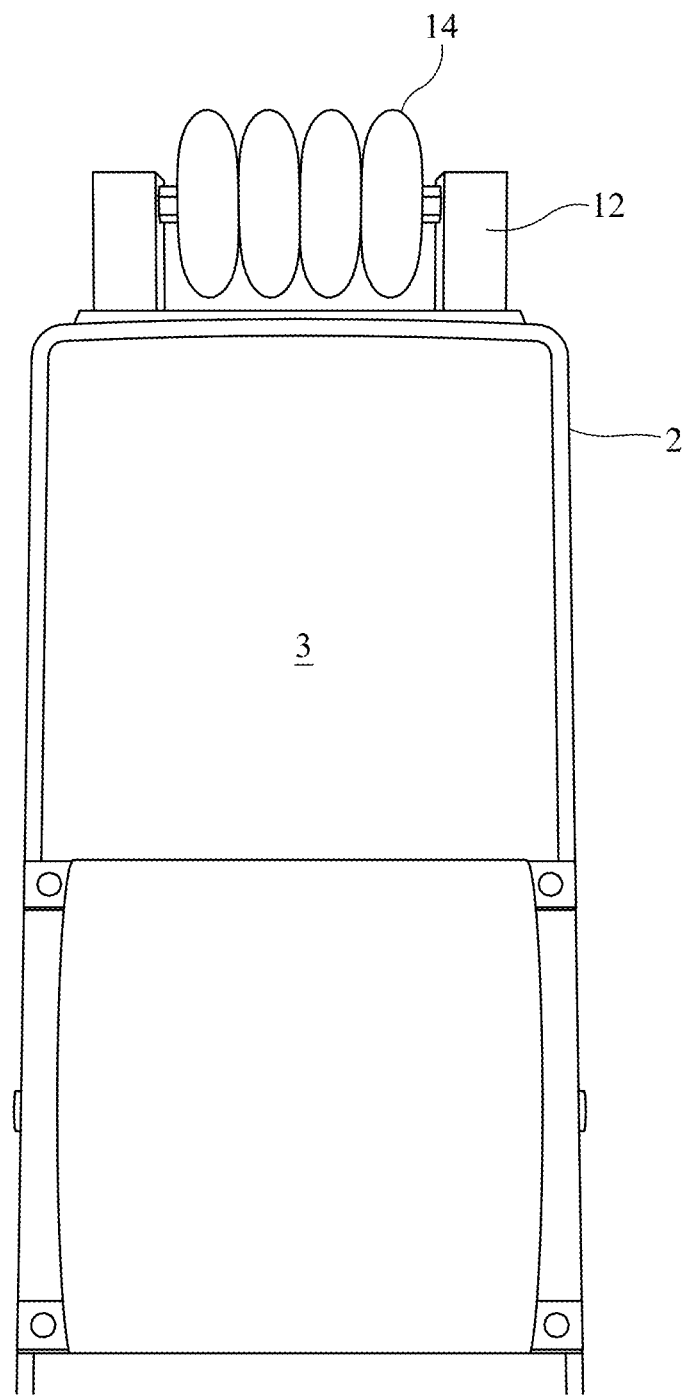
FIG. 9 is a top view of device shown in FIGS. 7-8 installed on a one-wheeled device.

A second embodiment nose-dive prevention device is shown in FIGS. 7-12. FIGS. 7 and 8 depict the second embodiment device in kit form, while FIGS. 9-12 depict the second embodiment device installed on a one-wheeled motorized device 3.

Figure 10:
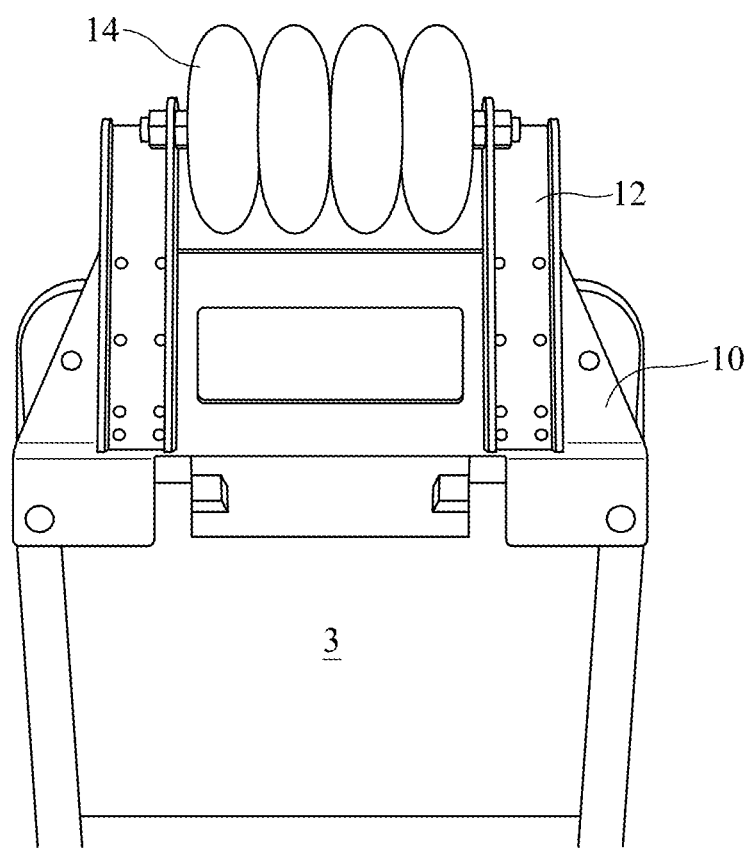
FIG. 10 is a bottom view of the device shown in FIGS. 7-8 installed on a one-wheeled device.

A plate 10 and brackets 12 provide a base for fixed attachment to a one-wheeled motorized device 2. Plate 10 may be of stainless steel, which may be molded or formed by any suitable manner, is configured for attachment to the frontal part 2 of one-wheeled motorized device 3, and includes brackets 12 to provide an axle to support four 80 mm wheels 14 with, for example, eight bearings, two for each wheel 14. It will be appreciated that wheels 14 of other sizes may be used, such as from 50 mm to 100 mm. Brackets 12 may be, for example, welded to plate 10, or connected by any other suitable means, such as riveting or the like. In an alternative embodiment, brackets 12 and plate 10 may be integrally formed. As shown in FIG. 10, plate 10 includes a bend that angularly conforms to the tapered front end (typically, a bumper) of the bottom of one-wheeled device 3, so that a first portion of plate 10 can attach to the bottom of one-wheeled device 3, while a second portion of plate 10 conforms to, and can be attached to, the tapered front end of the one-wheeled device 3. This bend may be from, for example, 15 to 45 degrees. Brackets 12 extend along the angled, second portion of plate 10.

Figure 11:
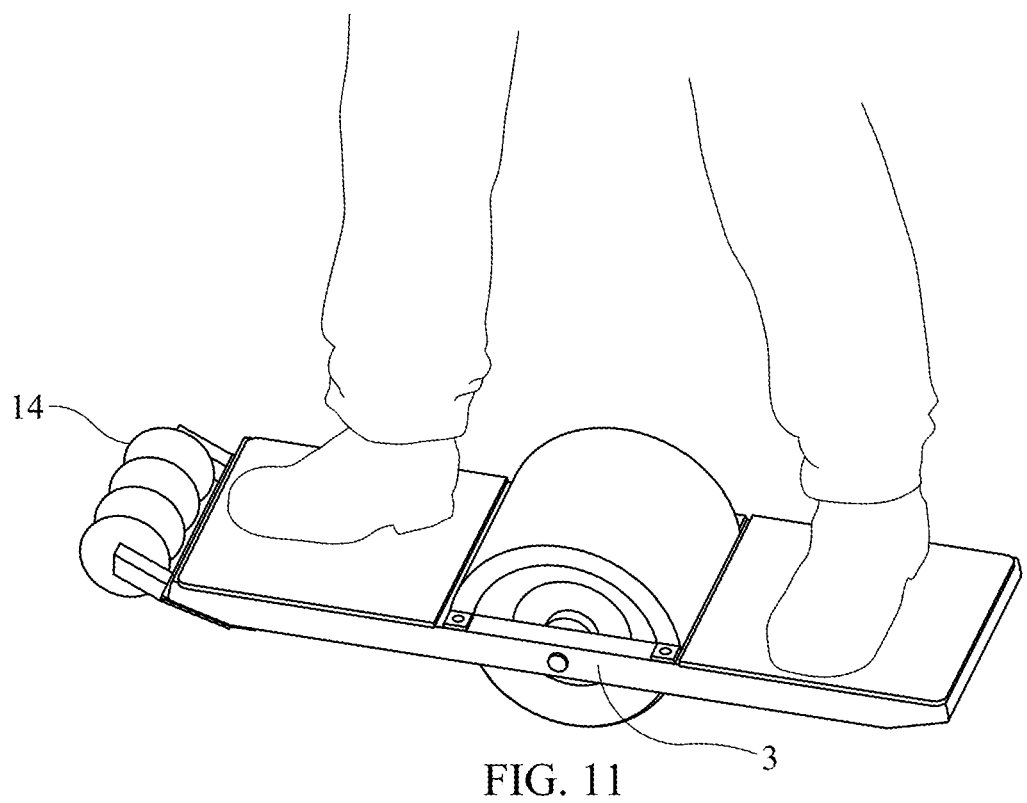
FIG. 11 shows the device of FIGS. 7-8 in use during normal operations of a one-wheeled device.

As shown in FIG. 11, wheels 14 are set high enough to allow for normal riding of one-wheeled device 3 without affecting the normal angular variation and tipping of the riding platform needed during normal riding, which offsetting of wheels 14 may be facilitated by the angular bend in plate 10 and the length of brackets 12 that extend along this bend. As noted above, during normal riding, there may be about 6 inches of clearance between front end 2 and the ground. Wheels 14 may be placed to reduce this range of angular movement from 6 inches to 5 inches, for example.

The second embodiment may be attached to the motorized one-wheeled device with, for example, two screws on the tapered rail and another two screws into the bottom plastic of the one-wheeled device 3.

Figure 12:
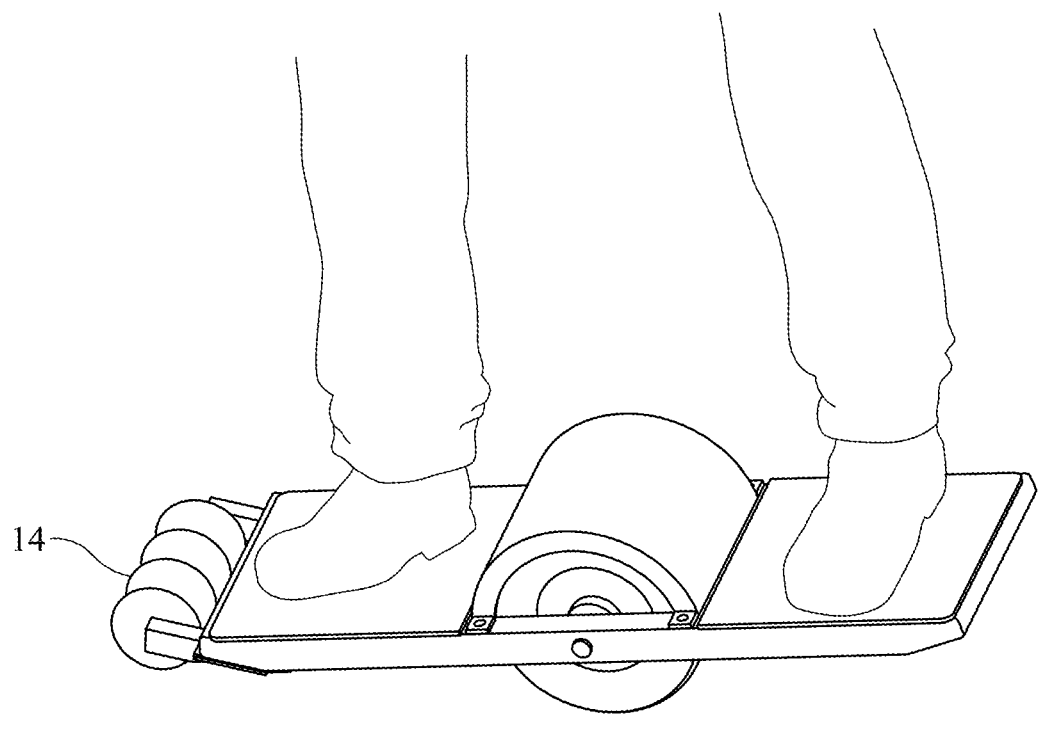
FIG. 12 shows the device of FIGS. 7-8 in use during in a nose-dive situation.
Figure 13:
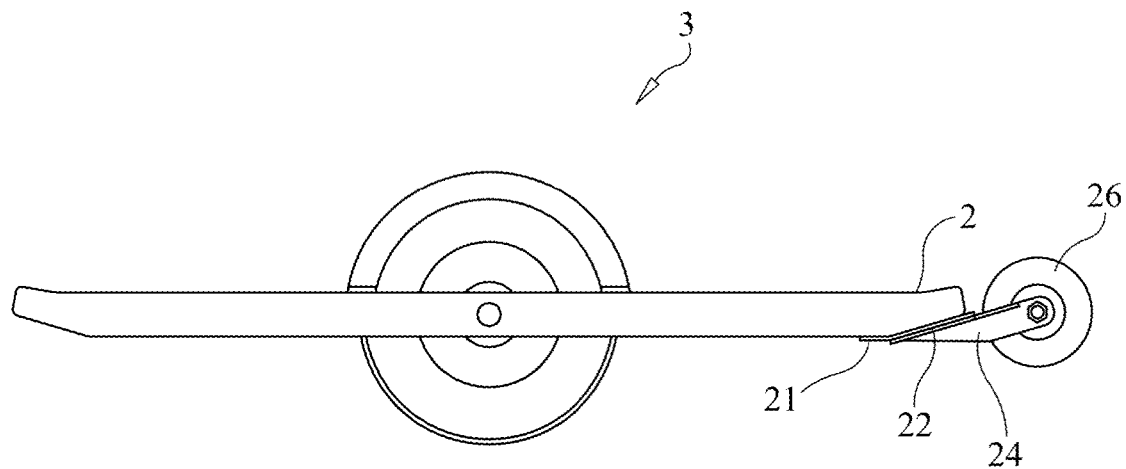
FIG. 13 is a side view of a fourth embodiment nose-dive prevention device installed on a one-wheeled device.
Figure 14:
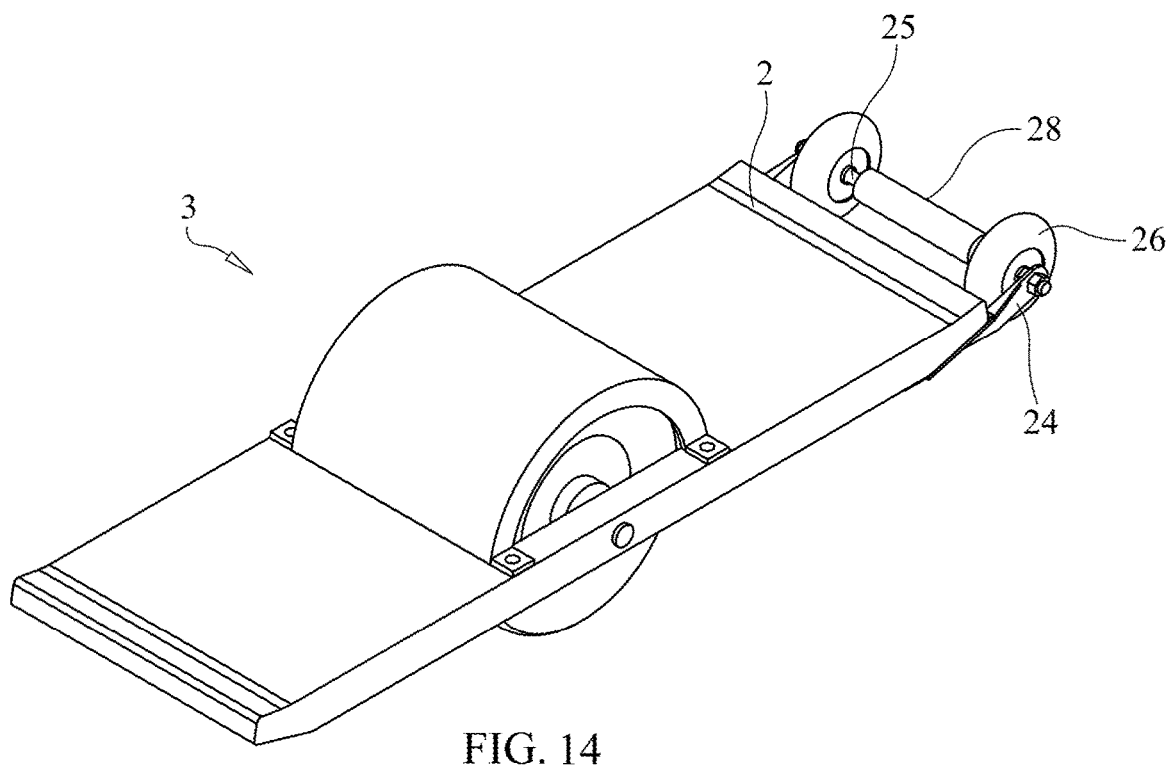
FIG. 14 is a top perspective view of the embodiment shown in FIG. 13.
Figure 15:
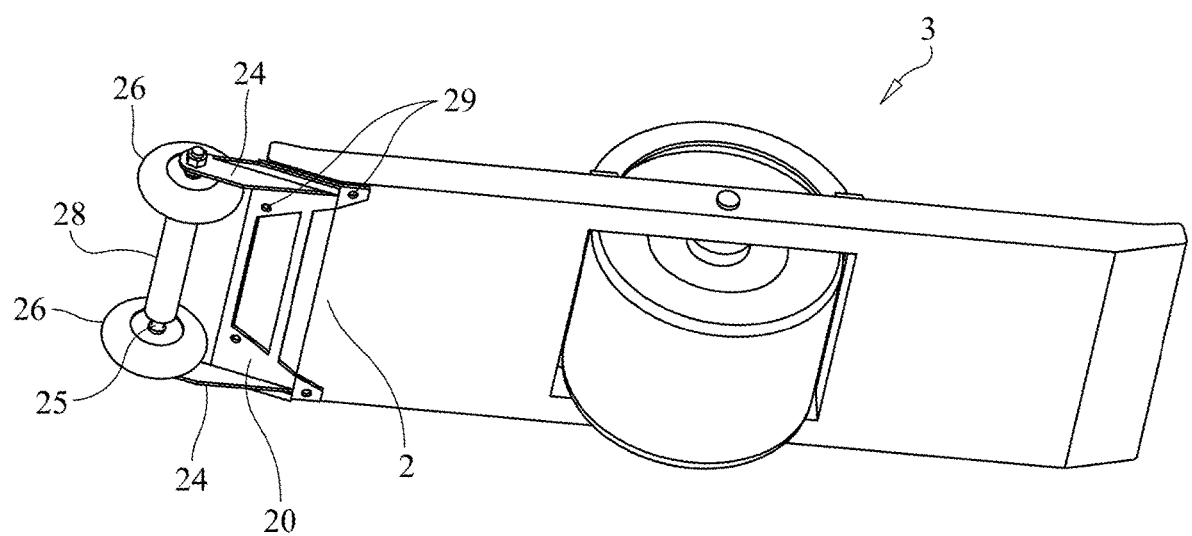
FIG. 15 is a bottom perspective view of the embodiment shown in FIG. 13.
Figure 16:
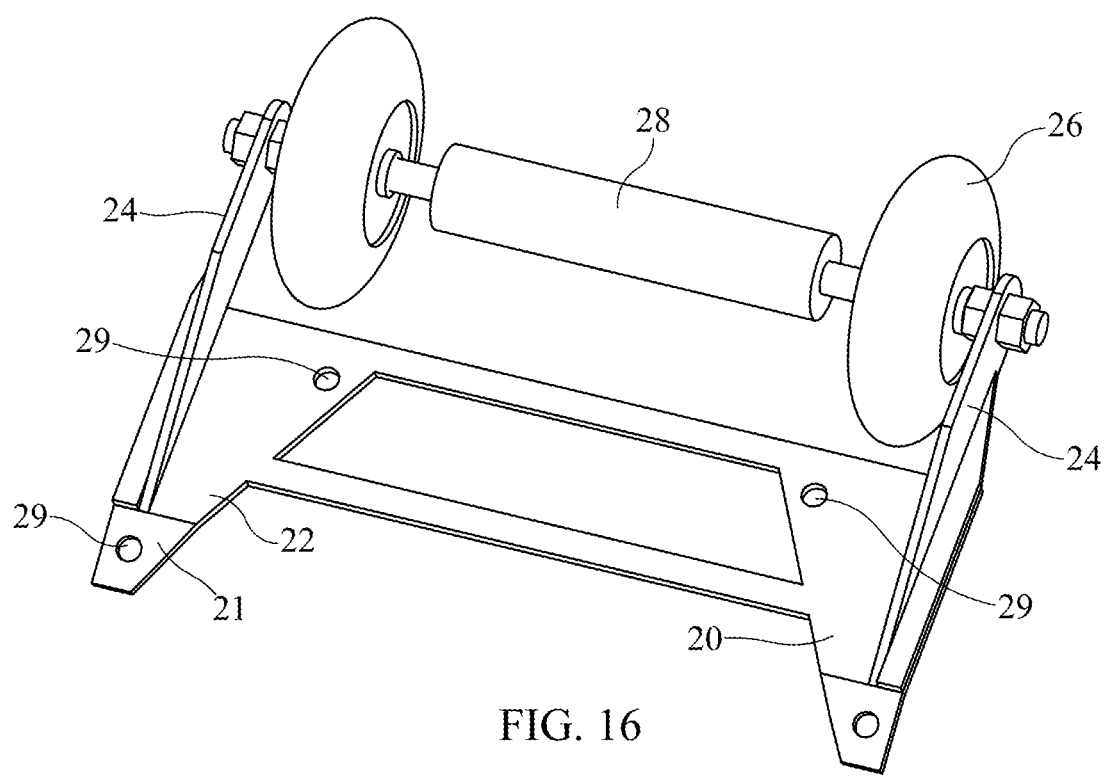
FIG. 16 is a bottom perspective view of a portion of a kit for the embodiment shown in FIG. 13.
Figure 17:
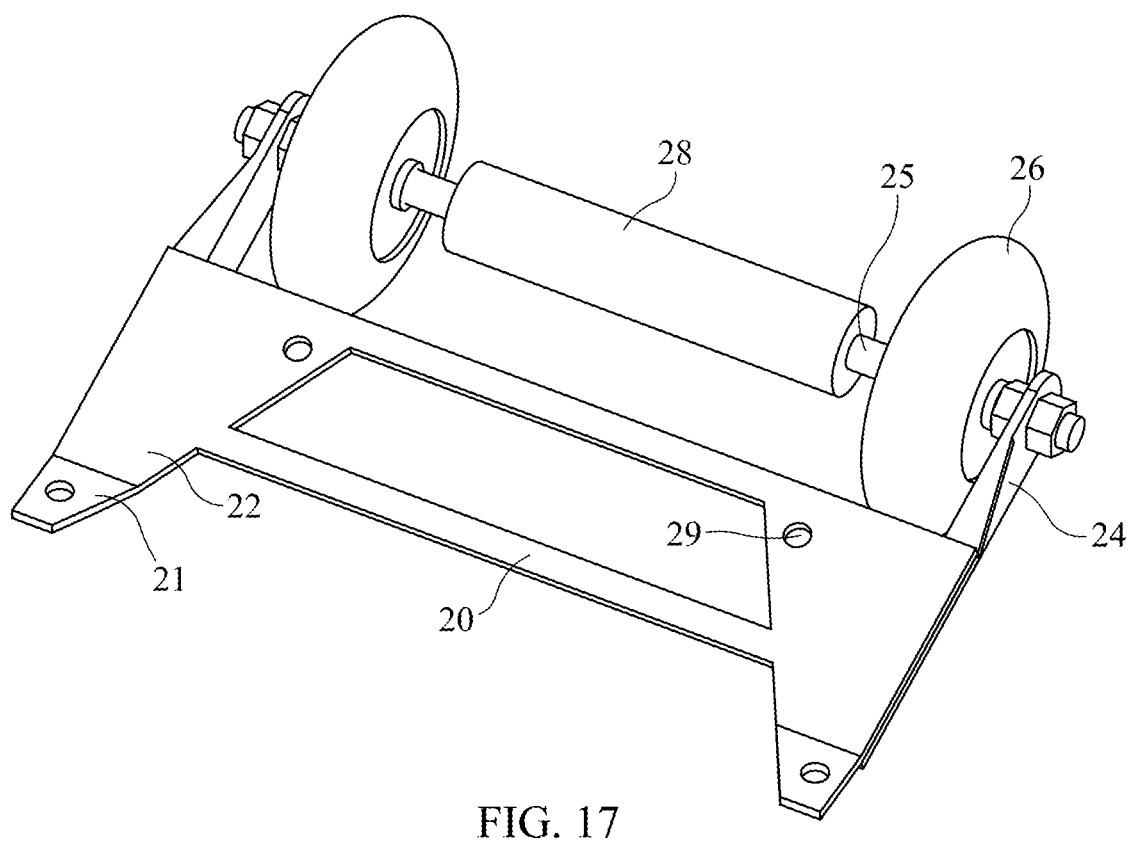
FIG. 17 is a top perspective view of a portion of a kit for the embodiment shown in FIG. 13.

As shown in FIG. 12, an objective of the second embodiment is, in the event of a nose-dive, the rider won't slam down into the ground. Instead, when the riding platform of one-wheeled device 3 reaches the nose-dive tipping angle (that is, the front angle tipping of the riding platform becomes excessive with respect to the ground), wheels 14 will contact the ground instead of the front bumper, thus allowing time to slide and run it out.

A third embodiment nose-dive prevention device is shown in FIGS. 13-17, which is similar in design to the second embodiment, but which includes a space between the nose-dive wheels which can be used for a handle.

A kit for the third embodiment nose-device prevention device includes a steel plate 20, which may be molded or formed by any suitable manner, and is configured for attachment to the frontal part 2 of one-wheeled motorized device 3. Plate 20 may, however, be made from any suitable material, such as stainless steel, aluminum, and carbon fiber. Plate 20 includes first portion 21 that is bent with respect to a second portion 22. The bend in plate 20 angularly conforms to the tapered bottom front end of the one-wheeled device 3, so that first portion 21 can attach to the bottom of one-wheeled device 3, while second portion 22 conforms to, and can be attached to, the tapered front end (typically the bumper) of the one-wheeled device 3. This bend may be from, for example, 15 to 45 degrees, and more preferable is from 20 to 30 degrees, more preferably still about 25 degrees. Plate 20 includes two or more holes 29 on first portion 21, and two or more holes 29 on second portion 22, whereby a user can use screws through holes 29 to fixedly attach plate 20 to a bottom front portion of a one-wheeled motorized device 3, as shown in the figures. It will be appreciated that other numbers and positioning of holes 29 are possible.

Plate 20 includes two fixed brackets 24 that extend along the angled, second portion 22 of plate 20. An end of brackets 24 provide a mount for an axle 25, which, in turn, rotatably supports two spaced-apart 80 mm wheels 26 with, for example, four bearings, two for each wheel 26. It will be appreciated that wheels 26 of other sizes may be used, such as from 50 mm to 100 mm, and more preferably about 80 mm. Brackets 24 may be, for example, welded to plate 20, or connected by any other suitable means, such as riveting, epoxy, or the like. In an alternative embodiment, brackets 24 and plate 20 may be integrally formed.

A handle 28 is rotatably mounted on axle 25 between wheels 26. Handle 28 may be, for example, a hollow tube of any suitable material, such as plastic, sleeved onto axle 25. Handle 28 has a width that is sufficiently wide for gripping by a hand of the user. By way of example, the width may be from 20 mm to 35 mm, more preferably about 25 mm.

Axle 25 may be removably connected to brackets 24, such as by way of nuts and bolts, a quick disconnect fitting, or the like. A user may remove axle 25 and remove handle 28 to instead insert one, two, or more additional wheels 26 onto axle 25, in addition to the two spaced-apart wheels 26. A greater number of wheels 26 may provide better results for off-road riding, whereas two wheels 26 are typically sufficient for riding on pavement/asphalt. Hence, handle 28 and wheels 26 may be removably disposed on axle 25.

As with the previous embodiments, the angle of plate 20 and length of brackets 24 ensure that wheels 26 are set high enough to allow for normal riding without affecting the needed front angle variation during normal riding of the one-wheeled device 3, yet when a nose-dive occurs for any reason, causing the front end angle to become excessive and reach a nose-dive angle, wheels 26 will touch the ground and allow a slide-out instead of the bumper contacting the ground, which may otherwise cause sudden stoppage in momentum-throwing the rider forward into a dive. By way of example, if the one-wheeled device normally has a 6-inch tipping range, wheels 26 may reduce this tipping range to 5 inches. That is, the tipping angle is that angle that the riding platform achieves when front end 2 noses down by 5 inches.

Figure 18:
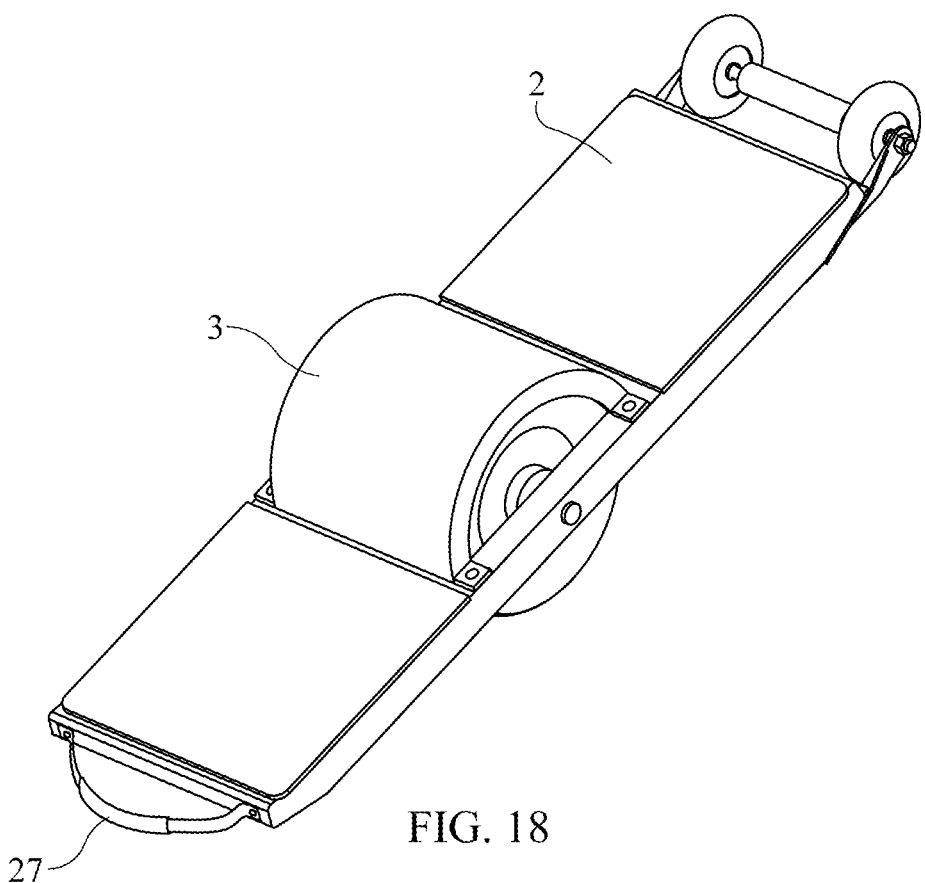
FIG. 18 shows a kit of the fourth embodiment installed on a one-wheeled motorized device.
Figure 19:
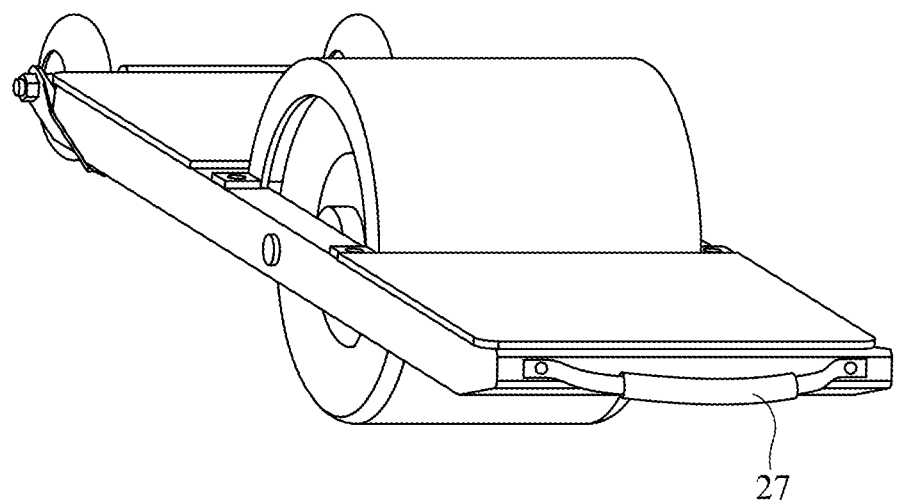
FIG. 19 shows a grip included in a kit of the fourth embodiment installed on an end of a one-wheeled motorized device opposite the nose-dive prevention device.

As shown in FIG. 18, a kit for any embodiment nose-dive prevention device may further include a grip 27. Grip 27 may include eyelets, grommets, or the like on either end of a strap, which may be used to screw handle 27 onto an end of one-wheeled device 3 opposite that of the nose-dive prevention device. A rubber sleeve or the like may be disposed around a central portion of the strap to provide a suitable grip for the user. Grip 27 provides a convenient method for dragging the one-wheeled motorized device 3 in a manner analogous to luggage, with the wheels of the nose-dive prevention device serving as carriage wheels when dragging device 3 via handle 27.

Those skilled in the art will recognize that the present invention has many applications, may be implemented in various manners and, as such is not to be limited by the foregoing embodiments and examples. Any number of the features of the different embodiments described herein may be combined into one single embodiment, the locations of particular elements can be altered and alternate embodiments having fewer than or more than all of the features herein described are possible. Functionality may also be, in whole or in part, distributed among multiple components, in manners now known or to become known.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention. While there have been shown and described fundamental features of the invention as applied to being exemplary embodiments thereof, it will be understood that omissions and substitutions and changes in the form and details of the disclosed invention may be made by those skilled in the art without departing from the spirit of the invention. Moreover, the scope of the present invention covers conventionally known, future developed variations and modifications to the components described herein as would be understood by those skilled in the art.

What is claimed is:

1. A nose-dive prevention device for a one-wheeled motorized transportation device, the nose-dive prevent device comprising:
    a base configured to be fixedly attached to a first end of the one-wheeled motorized transportation device; and
    at least one wheel connected to the base;
    wherein the at least one wheel is positioned to contact ground when the first end exceeds a nose-dive angle, and is spaced above the ground when the first end is less than the nose-dive angle; and
    wherein the base is further configured such that the at least one wheel extends beyond the first end of the one-wheeled motorized transportation device,
    wherein the base comprises a plate configured to be fixedly attached to the one-wheeled motorized transportation device, and at least a bracket extending from the plate, the at least one wheel rotatably connected to the bracket,
    wherein the nose-dive prevention device further comprises at least two wheels mounted and spaced-apart on an axle, the axle connected to the bracket, a handle rotatably mounted on the axle and disposed between the two wheels.

2. The nose-dive prevention device of claim 1, wherein the plate comprises a first portion and a second portion, the first portion bent with respect to the second portion so that the plate conforms to the first end of the one-wheeled motorized transportation device.

3. The nose-dive prevention device of claim 2, wherein the bracket extends along at least the second portion of the plate.

4. The nose-dive prevention device of claim 1 wherein the axle is removably connected to the bracket.

5. The nose-dive prevention device of claim 4 wherein the handle and the wheels are removably disposed on the axle.

6. The nose-dive prevention device of claim 1 further comprising a grip configured to be attached to a second end of the one-wheeled motorized transportation device opposite the first end.

7. A nose-dive prevention device for a one-wheeled motorized transportation device, the nose-dive prevent device comprising:
    a base configured to be fixedly attached to a first end of the one-wheeled motorized transportation device; and
    at least one wheel connected to and extending from the base;
    wherein the at least one wheel is positioned to interpose between the first end of the one-wheeled motorized transportation device and ground and contact the ground when the first end exceeds a nose-dive angle, and is spaced above the ground when the first end is less than the nose-dive angle;
    wherein the base comprises a plate configured to be fixedly attached to the one-wheeled motorized transportation device, and at least a bracket extending from the plate, the at least one wheel rotatably connected to the bracket; and
    wherein the plate comprises a first portion and a second portion, the first portion bent with respect to the second portion so that the plate conforms to the first end of the one-wheeled motorized transportation device.

8. The nose-dive prevention device of claim 7, wherein the bracket extends along at least the second portion of the plate.

9. The nose-dive prevention device of claim 7 further comprising a grip configured to be attached to a second end of the one-wheeled motorized transportation device opposite the first end.

10. The nose-dive prevention device of claim 7 further comprising at least two wheels mounted and spaced-apart on an axle, the axle connected to the bracket, a handle rotatably mounted on the axle and disposed between the two wheels.

11. The nose-dive prevention device of claim 10 wherein the axle is removably connected to the bracket.

12. The nose-dive prevention device of claim 11 wherein the handle and the wheels are removably disposed on the axle.

13. A nose-dive prevention device for a one-wheeled motorized transportation device, the nose-dive prevent device comprising:
- a base configured to be fixedly attached to a first end of the one-wheeled motorized transportation device; and
- at least two wheels connected to and extending from the base;
- wherein the at least two wheels are positioned to interpose between the first end of the one-wheeled motorized transportation device and the ground and contact the ground when the first end exceeds a nose-dive angle, and are spaced above the ground when the first end is less than the nose-dive angle;
- wherein the base comprises a plate configured to be fixedly attached to the one-wheeled motorized transportation device, and at least a bracket extending from the plate, the at least two wheels rotatably connected to the bracket; and
- wherein the at least two wheels are mounted and spaced-apart on an axle, the axle connected to the bracket, a handle rotatably mounted on the axle and disposed between the at least two wheels.

14. The nose-dive prevention device of claim 13 wherein the axle is removably connected to the bracket.

15. The nose-dive prevention device of claim 14 wherein the handle and the wheels are removably disposed on the axle.

16. The nose-dive prevention device of claim 13, wherein the bracket extends along at least a second portion of the plate.

17. The nose-dive prevention device of claim 13 further comprising a grip configured to be attached to a second end of the one-wheeled motorized transportation device opposite the first end.

* * * * *